US012163379B2

(12) United States Patent
Pozgay et al.

(10) Patent No.: US 12,163,379 B2
(45) Date of Patent: Dec. 10, 2024

(54) EXTENSION LADDER WITH GROOVE BOX RAILS AND METHOD

(71) Applicant: Werner Co., Greenville, PA (US)

(72) Inventors: David S. Pozgay, Wilmette, IL (US); Thomas W. Parker, Jamestown, PA (US); Slavisa Dacic, Hanover Park, IL (US); Daniel R. Stumpf, Franklin, PA (US)

(73) Assignee: Werner Co., Greenville, PA (US)

( * ) Notice: Subject to any disclaimer, the term of this patent is extended or adjusted under 35 U.S.C. 154(b) by 99 days.

(21) Appl. No.: 16/795,132

(22) Filed: Feb. 19, 2020

(65) Prior Publication Data

US 2021/0198944 A1 Jul. 1, 2021

Related U.S. Application Data

(60) Provisional application No. 62/954,290, filed on Dec. 27, 2019, provisional application No. 62/954,276, filed on Dec. 27, 2019.

(51) Int. Cl.

*E06C 7/08* (2006.01)
*E06C 1/12* (2006.01)
*E06C 7/50* (2006.01)

(52) U.S. Cl.

CPC ................ *E06C 7/085* (2013.01); *E06C 1/12* (2013.01); *E06C 7/08* (2013.01); *E06C 7/086* (2013.01); *E06C 7/50* (2013.01)

(58) Field of Classification Search

CPC ............... E06C 1/12; E06C 7/08; E06C 7/085
See application file for complete search history.

(56) References Cited

U.S. PATENT DOCUMENTS 1,025,493 A 5/1912 Vogel
1,191,729 A 7/1916 Pool
1,835,243 A 12/1931 Schaffert
2,327,585 A 8/1943 Ulrich
2,545,752 A 3/1951 Singleton
2,560,961 A 7/1951 Friedrich
(Continued)

FOREIGN PATENT DOCUMENTS

GB 1198512 A * 7/1970 ............... E06C 1/12

OTHER PUBLICATIONS

USPTO; U.S. Appl. No. 16/795,086; Notice of Allowance and Fees Due (PTOL-85) mailed Oct. 4, 2023; (pp. 1-9).
(Continued)

*Primary Examiner* — Colleen M Chavchavadze
(74) *Attorney, Agent, or Firm* — Fitch, Even, Tabin & Flannery LLP

(57) ABSTRACT

An extension ladder having a base section having a first box shaped base rail having a base side and a groove extending along the side. The extension ladder has a fly section having a first box shaped fly rail, and a follower bracket attached to the first box shaped fly rail and extending outward toward the first box shaped base rail. The groove is sized to engage the follower bracket which constrains the fly section to have limited motion relative to the base section and a left to right and front to rear directions while permitting the fly section to slide freely relative to the base section when the fly section is extended. A method for using an extension ladder. A method for producing an extension ladder.

18 Claims, 10 Drawing Sheets

(56) References Cited

U.S. PATENT DOCUMENTS 2,562,336 A 7/1951 Selden
2,713,284 A 7/1955 Bedford, Jr.
2,760,706 A * 8/1956 Pearl ........................ E06C 7/06 182/211
2,767,877 A 10/1956 Newsom
2,957,543 A * 10/1960 Larson ...................... E06C 1/12 182/228.1
2,989,141 A 6/1961 Howard
3,002,582 A 10/1961 Marcelis
3,004,625 A 10/1961 Arnold
3,030,850 A 4/1962 Minor
3,076,668 A 2/1963 Famely
3,078,002 A 2/1963 Rodgers, Jr.
3,092,162 A 6/1963 Johnsen
3,099,057 A 7/1963 Cook
3,103,547 A 9/1963 Ansley
3,168,938 A 2/1965 Shaver
3,181,651 A 5/1965 Larson
3,208,554 A 9/1965 Arnold
3,232,378 A 2/1966 Larson
3,270,410 A 9/1966 Salter
3,279,835 A 10/1966 Krohm
3,283,402 A 11/1966 Larson
3,318,413 A 5/1967 Werner
3,327,385 A 6/1967 Shaver
3,343,630 A * 9/1967 Redman .................... E06C 1/12 182/209
3,349,870 A 10/1967 Lieblein
3,354,987 A 11/1967 Werner
3,402,788 A * 9/1968 Redman .................... E06C 1/12 182/207
3,426,867 A 2/1969 Berger
3,452,149 A 6/1969 Rinaldi
3,454,135 A * 7/1969 Montgomery ............ E06C 7/06 182/209
3,462,114 A 8/1969 O'Dell, Sr.
3,481,026 A 12/1969 Lindesmith
3,484,931 A 12/1969 Lindesmith
3,491,853 A * 1/1970 Stillman, Jr. ............. E06C 1/12 182/46
3,528,525 A 9/1970 Lindesmith
3,545,072 A 12/1970 Lindesmith
3,766,631 A 10/1973 Scheitlin
3,830,134 A 8/1974 Erickson
3,836,704 A 9/1974 Coules
3,837,208 A 9/1974 Gray
3,844,588 A 10/1974 Jocsak
3,880,257 A 4/1975 Gubri
3,893,776 A 7/1975 Beattie
3,935,926 A * 2/1976 Butler ....................... E06C 1/12 182/208
4,010,519 A 3/1977 Worthing
4,033,243 A 7/1977 Kirrish
4,140,040 A 2/1979 Modrey
4,177,879 A 12/1979 Frank
4,205,426 A 6/1980 Stillman, Jr.
4,219,102 A 8/1980 Catherine
4,244,661 A 1/1981 Dervy
4,261,436 A 4/1981 Stillman, Jr.
4,363,580 A 12/1982 Bell
4,449,878 A 5/1984 Hallock
4,557,100 A 12/1985 Gorges
4,597,687 A 7/1986 Colas
4,656,721 A 4/1987 Werner
4,698,896 A 10/1987 Osterwald
4,761,105 A 8/1988 Gardner
4,766,664 A 8/1988 Benedyk
4,773,804 A 9/1988 Ausprung
4,784,550 A 11/1988 Wollar
4,802,643 A * 2/1989 Uys ...................... H02G 3/0456 403/363
4,807,351 A 2/1989 Berg
4,934,861 A 6/1990 Weeks
4,967,879 A 11/1990 Klafs
5,040,917 A 8/1991 Camuffo
5,244,326 A 9/1993 Henriksen
5,304,012 A 4/1994 Wendling
5,317,798 A 6/1994 Thompson
5,528,812 A 6/1996 Mueller
5,682,678 A 11/1997 Gallagher
5,685,663 A 11/1997 Sadri
5,758,745 A * 6/1998 Beggs ....................... E06C 1/12 182/213
6,012,763 A 1/2000 Clemente
6,113,327 A 9/2000 Schrader
6,269,909 B1 * 8/2001 Grimes ..................... E06C 7/06 182/129
6,290,213 B1 9/2001 Laird
6,419,046 B1 7/2002 Cubbison
6,511,274 B1 1/2003 Nagayama
7,086,499 B2 8/2006 Moss
7,201,398 B1 4/2007 Christofaro
7,300,536 B1 11/2007 Wang
8,371,783 B2 2/2013 Diehl
8,434,984 B2 5/2013 Toosky
8,484,930 B2 7/2013 Ruehl
8,591,158 B2 11/2013 Diehl
8,668,049 B2 3/2014 Leng
8,807,281 B1 8/2014 Hoffman
10,661,837 B2 5/2020 Madsen
10,753,224 B2 8/2020 Mena Dominguez
10,760,335 B2 9/2020 Mora
11,142,949 B2 * 10/2021 Leng ....................... E06C 1/125
11,274,494 B2 * 3/2022 Leng ......................... E06C 1/38
11,866,995 B2 1/2024 Parker
11,885,181 B2 1/2024 Parker
2003/0143053 A1 7/2003 Kanie
2004/0175254 A1 9/2004 Peng
2006/0137166 A1 6/2006 Babej
2006/0228194 A1 10/2006 Nilsen
2007/0107368 A1 5/2007 Ruehl
2010/0124471 A1 5/2010 Diehl
2011/0150597 A1 6/2011 Muramatsu
2015/0075908 A1 3/2015 Moss
2018/0163468 A1 6/2018 Mora
2021/0079727 A1 * 3/2021 Garcia ...................... E06C 1/12
2021/0198943 A1 7/2021 Parker
2021/0198945 A1 7/2021 Parker

OTHER PUBLICATIONS

USPTO; U.S. Appl. No. 16/795,171; Notice of Allowance and Fees Due (PTOL-85) mailed Aug. 28, 2023; (pp. 1-12).
USPTO; U.S. Appl. No. 16/795,086; Notice of Allowance and Fees Due (PTOL-85) mailed Nov. 28, 2023; (pp. 1-2).

* cited by examiner

EXTENSION LADDER WITH GROOVE BOX RAILS AND METHOD

CROSS-REFERENCE TO RELATED APPLICATIONS

This application claims priority from U.S. provisional application Ser. No. 62/954,276 filed Dec. 27, 2019, and U.S. provisional application Ser. No. 62/954,290 filed Dec. 27, 2019, both of which are incorporated by reference herein. This application also incorporates by reference U.S. patent application Ser. No. 16/795,086, filed concurrently with this application on Feb. 19, 2020; and incorporates by reference U.S. patent application Ser. No. 16/795,171, filed concurrently with this application on Feb. 19, 2020.

FIELD OF THE INVENTION

The present invention relates to extension ladders which use rectangular profile box rails. (As used herein, references to the "present invention" or "invention" relate to exemplary embodiments and not necessarily to every embodiment encompassed by the appended claims.) More specifically, the present invention relates to extension ladders which use rectangular profile box rails where there is a groove or indent running along the sides of box shaped rails in the base section of the extension ladder and the groove is sized to engage follower brackets which are attached to the fly section or the fly section rails.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Currently, most extension ladders use a C-Channel rail profile. The C-channel profile shape allows the fly and base sections of the ladder to interlock easily. The base rails are configured this way: [ ] and the fly rails are configured this way: ] [. Sometimes the base and fly sections engage directly with each other with the lower flanges of the fly rails hooked under the upper flanges of the base rails. Sometimes, for added strength, brackets on the fly section hook under the upper flanges of the base rails. However, with rectangular profile box rails there are no edges that can be used for this interlock.

BRIEF SUMMARY OF THE INVENTION

The present invention pertains to an extension ladder. The extension ladder comprises a base section having a first box shaped base rail having a base side and a groove extending along the base side, a second box shaped base rail in parallel and spaced relation to the first box shaped base rail, and base rungs attached to the first and second box shaped base rails. The extension ladder comprises a fly section having a first box shaped fly rail, a follower bracket attached to the first box shaped fly rail and extending outward toward the first box shaped base rail. The groove is sized to engage the follower bracket which constrains the fly section to have limited motion relative to the base section and a left to right and front to rear directions while permitting the fly section to slide freely relative to the base section when the fly section is extended. The fly section has a second box shaped fly rail in parallel and spaced relation to the first box shaped fly rail and fly rungs attached to the first and second box shaped fly rails.

The present invention pertains to a method for using an extension ladder. The method comprises the steps of moving the ladder to a desired location. There is the step of placing the ladder into a desired position. The ladder comprises a base section having a first box shaped base rail having a base side and a groove extending along the base side and a second box shaped base rail in parallel and spaced relation to the first box shaped base rail, and base rungs attached to the first and second box shaped base rails. The ladder comprises a fly section having a first box shaped fly rail, a follower bracket attached to the first box shaped fly rail and extending outward toward the first box shaped base rail. The groove is sized to engage the follower bracket which constrains the fly section to have limited motion relative to the base section and a left to right and front to rear directions while permitting the fly section to slide freely relative to the base section when the fly section is extended. The fly section comprises a second box shaped fly rail in parallel and spaced relation to the first box shaped fly rail and fly rungs attached to the first and second box shaped fly rails.

The present invention pertains to a method for producing an extension ladder. The method comprises the steps of putting a base section in a desired position. The base section having a first box shaped base rail having a base side and a groove extending along the base side. There is the step of placing a follower bracket attached to a first box shaped fly rail of a fly section in the groove. There is the step of moving the fly section relative to the base section with the follower bracket in the groove into a desired position.

BRIEF DESCRIPTION OF THE SEVERAL VIEWS OF THE DRAWING

In the accompanying drawings, the preferred embodiment of the invention and preferred methods of practicing the invention are illustrated in which.

DETAILED DESCRIPTION OF THE INVENTION

Figure 4A:
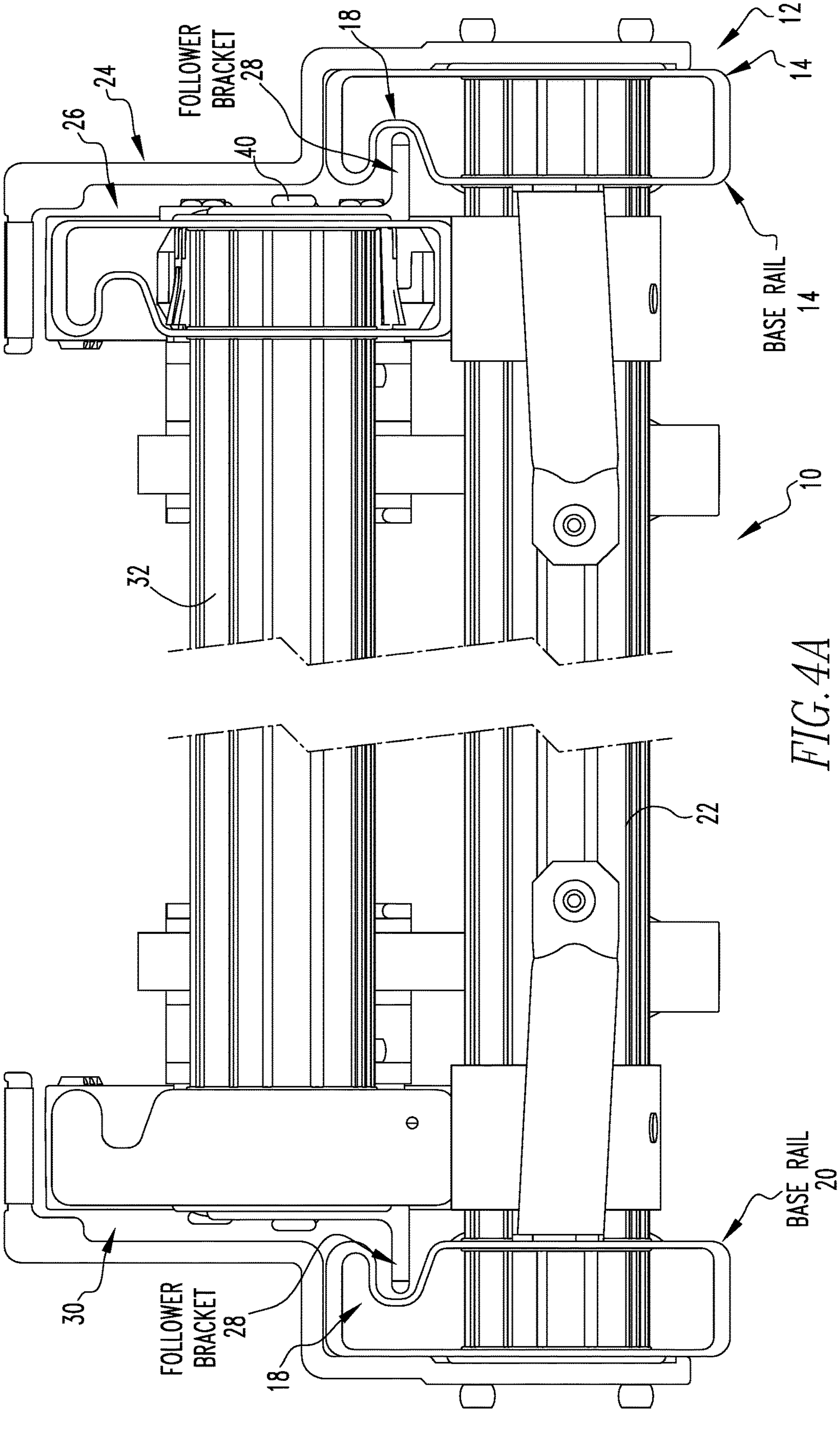
FIG. 4A is a bottom view of the extension ladder.
Figure 4B:
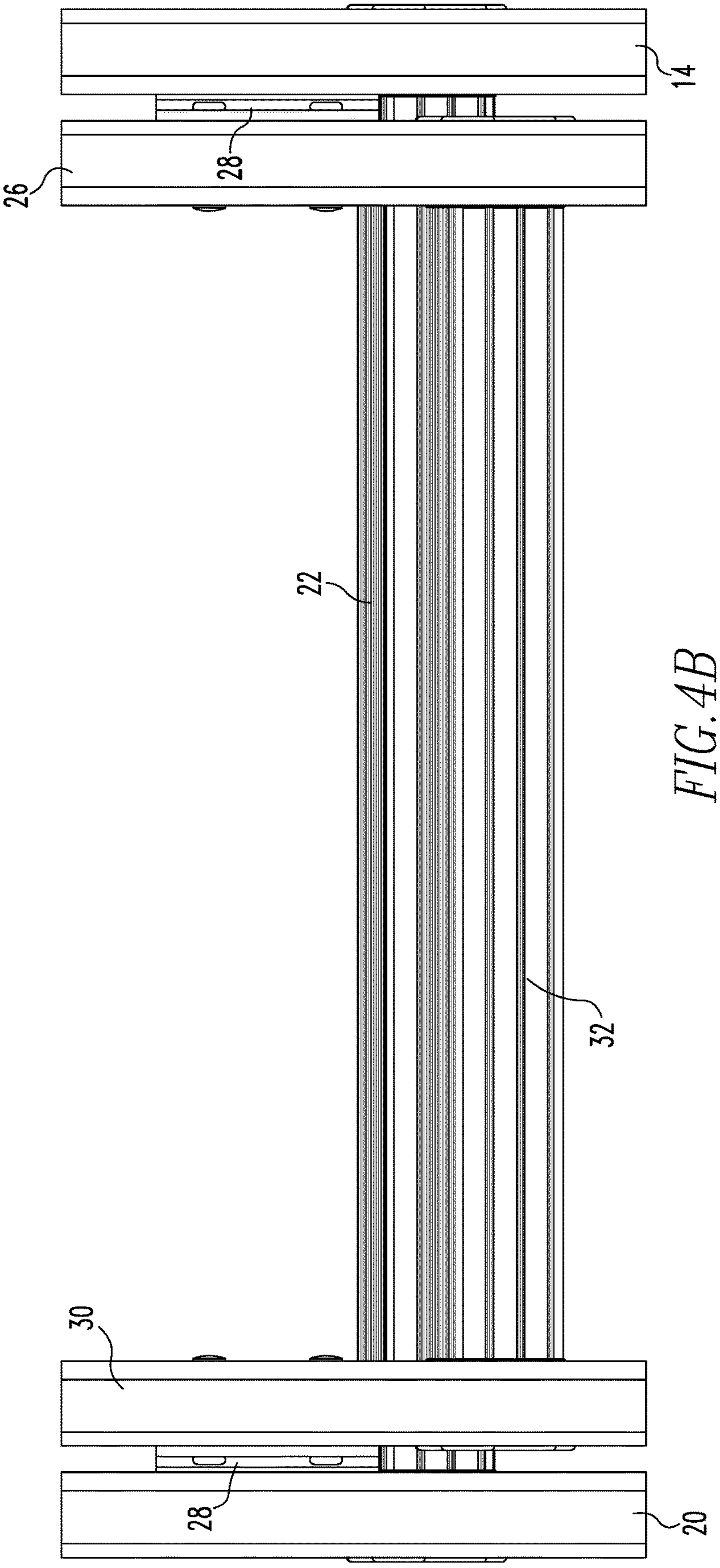
FIG. 4B is an overhead view of follower brackets engaged in grooves in rails of the extension ladder.

Referring now to the drawings wherein like reference numerals refer to similar or identical parts throughout the several views, and more specifically to FIGS. 1, 2A, 2B and 4A thereof, there is shown an extension ladder 10. The extension ladder 10 comprises a base section 12 having a first box shaped base rail 14 having a base side 16 and a groove 18 extending along the base side 16, a second box shaped base rail 20 in parallel and spaced relation to the first box shaped base rail 14, and base rungs 22 attached to the first and second box shaped base rails 14, 20. The extension ladder 10 comprises a fly section 24 having a first box shaped fly rail 26, and a follower bracket 28 attached to the first box shaped fly rail 26 and extending outward toward the first box shaped base rail 14. The groove 18 is sized to engage the follower bracket 28 which constrains the fly section 24 to have limited motion relative to the base section 12 and a left to right and front to rear directions while permitting the fly section 24 to slide freely relative to the base section 12 when the fly section 24 is extended. The fly section 24 has a second box shaped fly rail 30 in parallel and spaced relation to the first box shaped fly rail 26 and fly rungs 32 attached to the first and second box shaped fly rails 26, 30. FIG. 4B is an overhead view of follower brackets 28 engaged in grooves in rails of the extension ladder 10.

Figure 1:
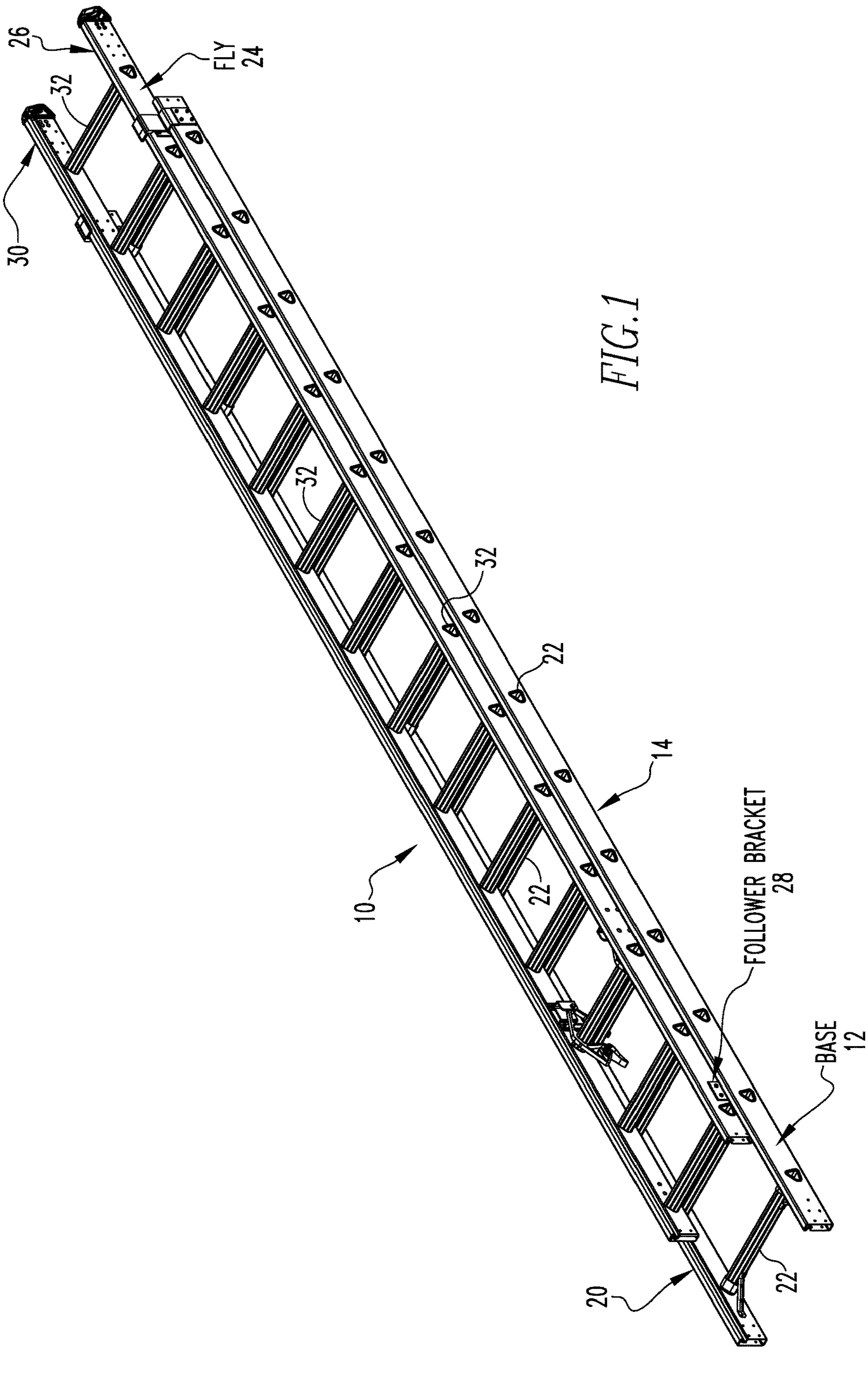
FIG. 1 is a perspective view of an extension letter of the present invention.
Figure 2A:
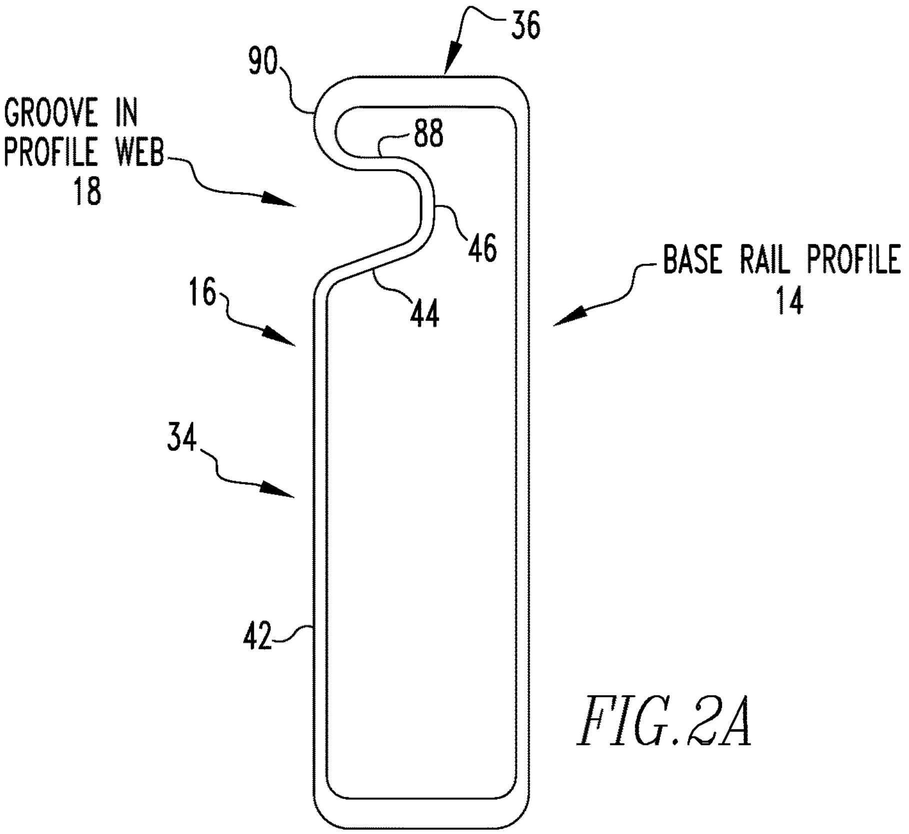
FIG. 2A is a cross-sectional view of a groove in a profile web of a first box shaped base rail.
Figure 2B:
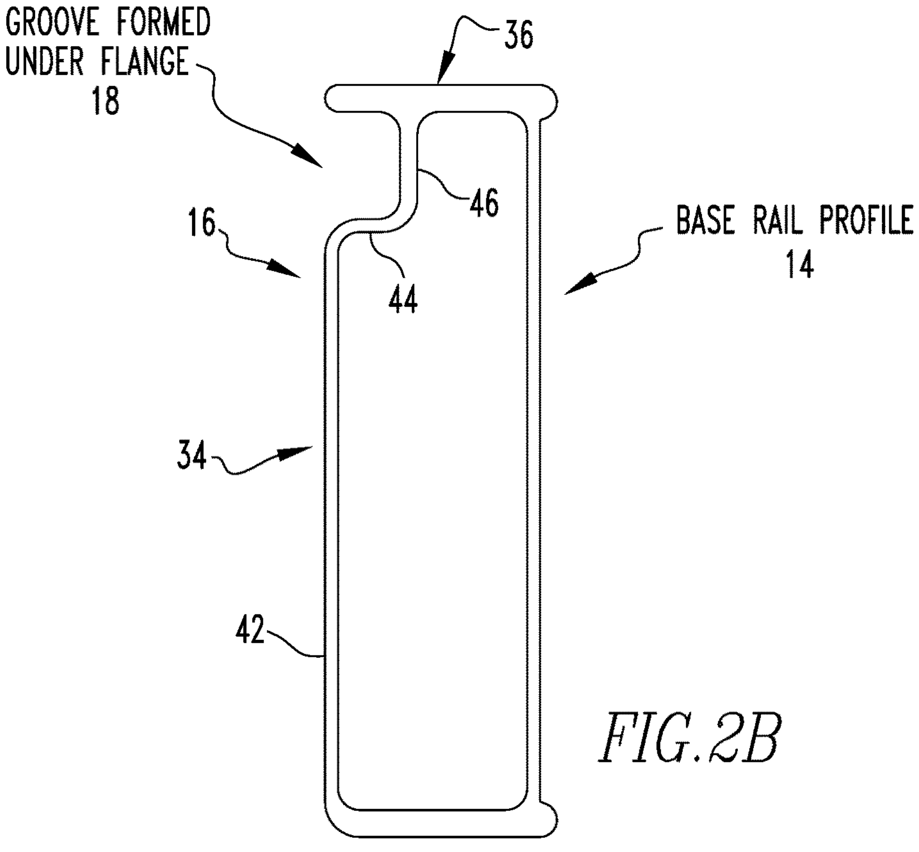
FIG. 2B is a cross-sectional view of a groove formed under a flange of a first box shaped base rail.
Figure 3A:
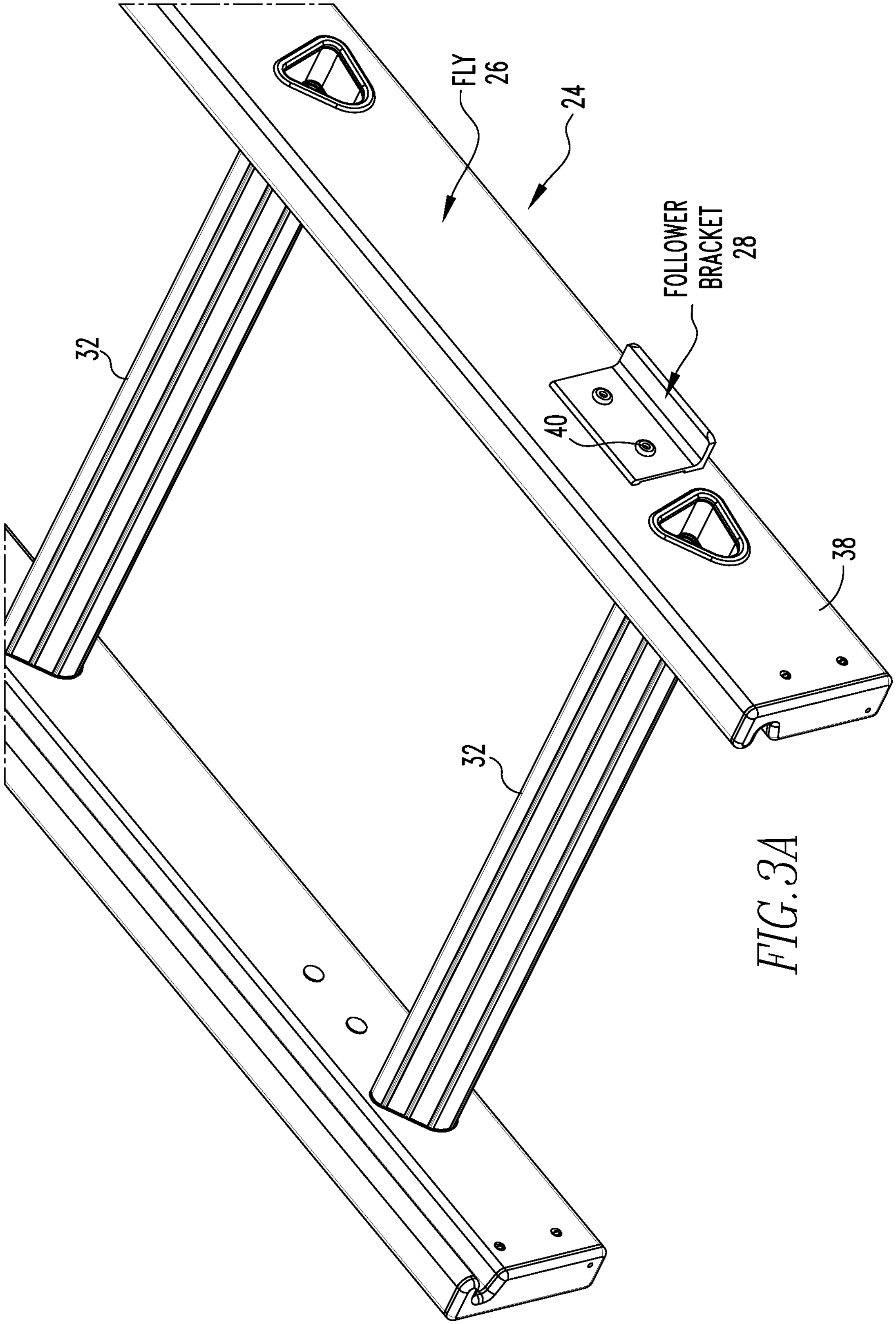
FIG. 3A is a perspective view of the extension ladder with a follower bracket.
Figure 3B:
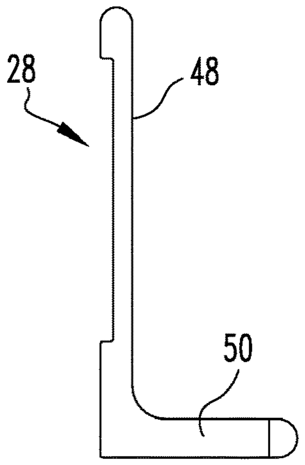
FIGS. 3B, 3C and 3D are side front and perspective views, respectively, of a follower bracket.
Figure 3C:
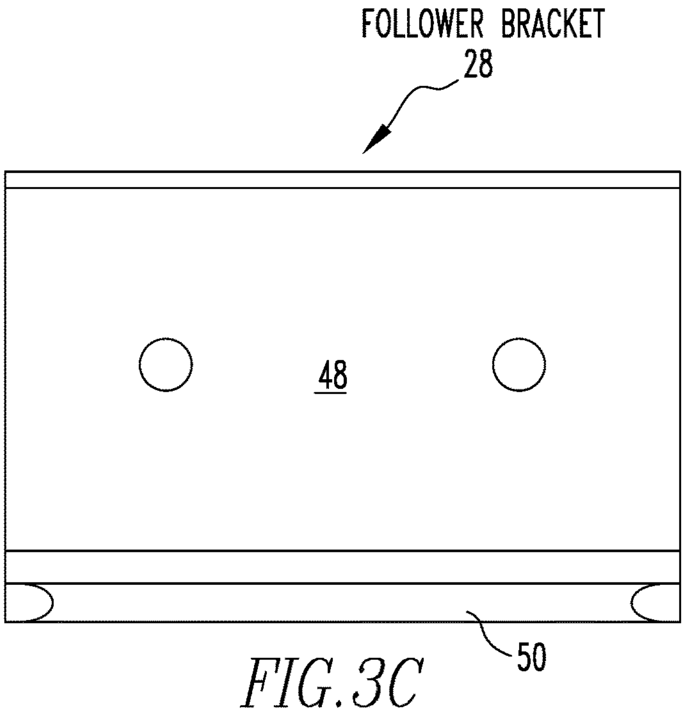
Figure 3D:
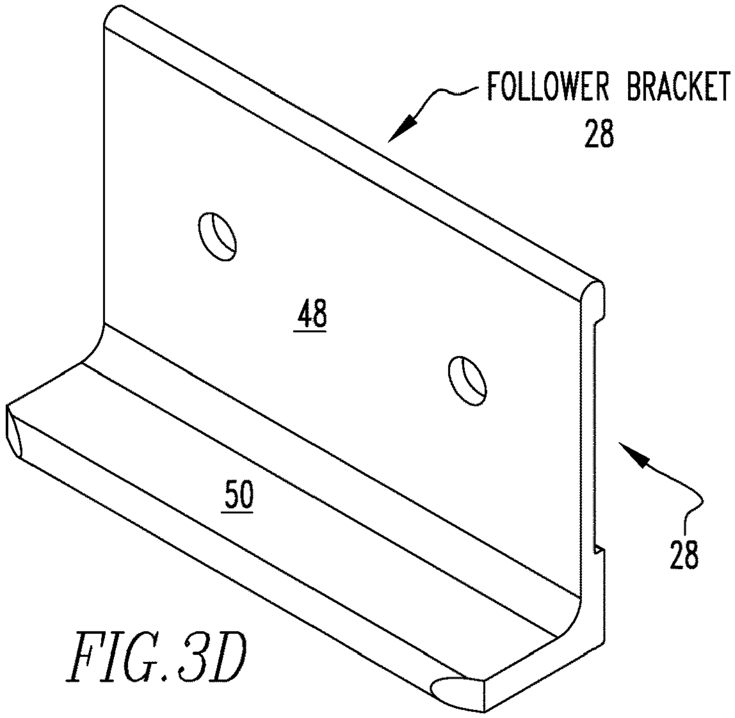

The first box shaped base rail 14 may have a web 34 and a flange 36. The groove 18 is formed in the web 34, as shown in FIG. 2A, or is formed by the flange 36 extending beyond the web 34, as shown in FIG. 2B. The first box shaped fly rail 26 may have a fly side 38, as shown in FIG. 3A, which opposes the web 34 of the first box shaped base rail 14. The follower bracket 28 may be attached by fasteners 40 to the fly side 38. The groove 18 may be in parallel with the fly side 38, and the web 34 has a first face 42, a second face 44 directly extending from the first face 42 away from the fly side 38, and a third face 46 directly extending from the second face 44 and in parallel with the first face 42. The second and third faces 44, 46 are part of the groove 18.

Figure 5A:
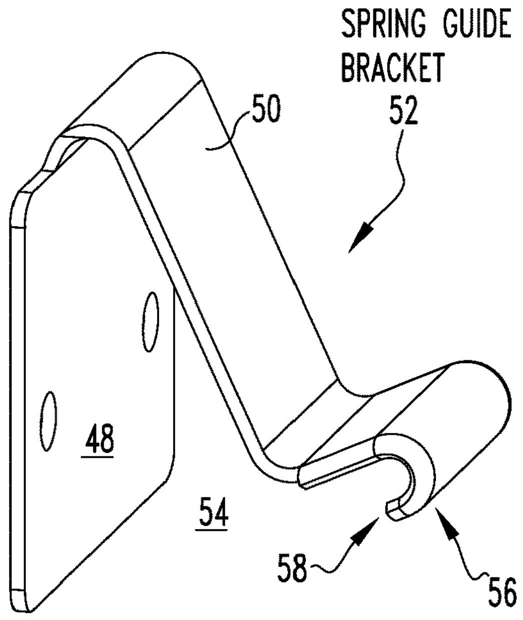
FIG. 5A is a perspective view of a spring guide bracket.
Figure 5B:
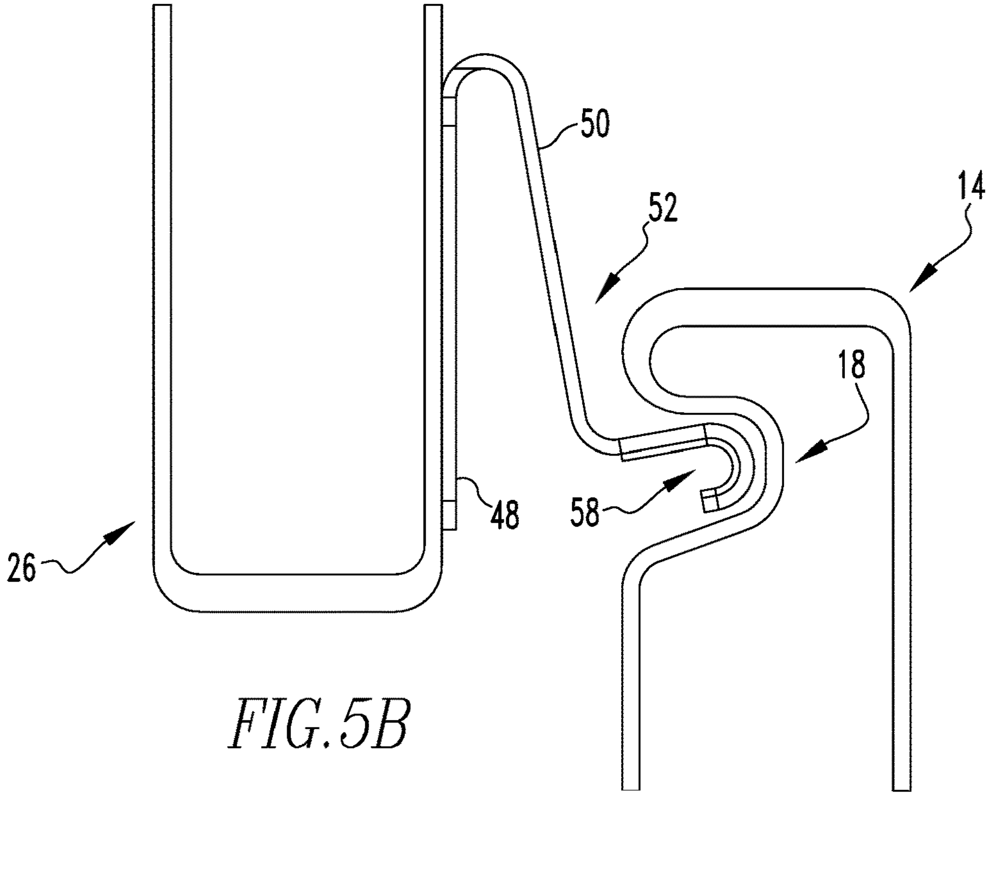
FIG. 5B shows a rounded hook of a free end of a spring guide bracket engaged in a groove in a first box shaped base rail.
Figure 6A:
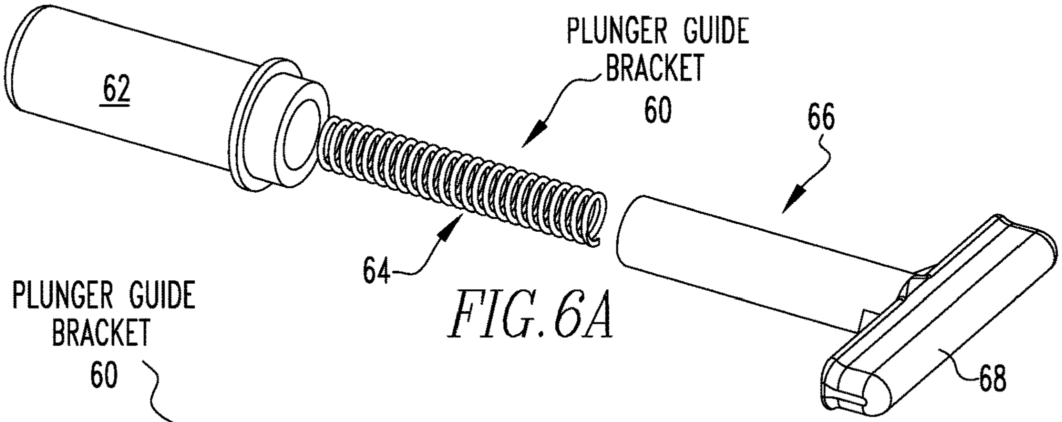
FIG. 6A shows an exploded view of a spring-loaded plunger guide bracket.
Figure 6B:
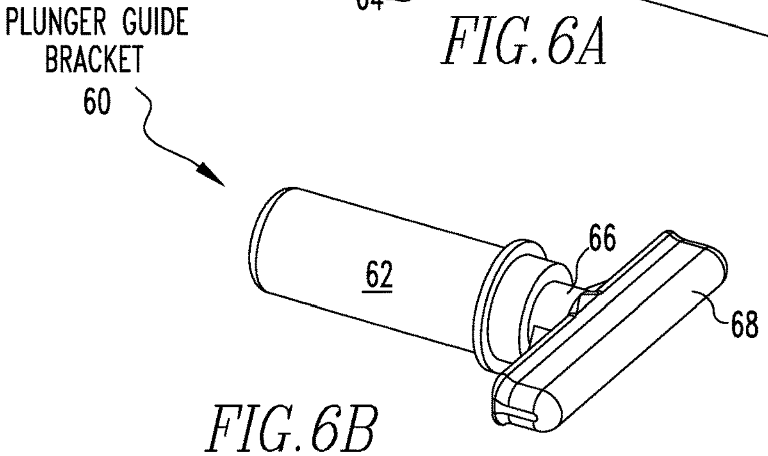
FIG. 6B is a perspective view of the spring-loaded plunger guide bracket.
Figure 6C:
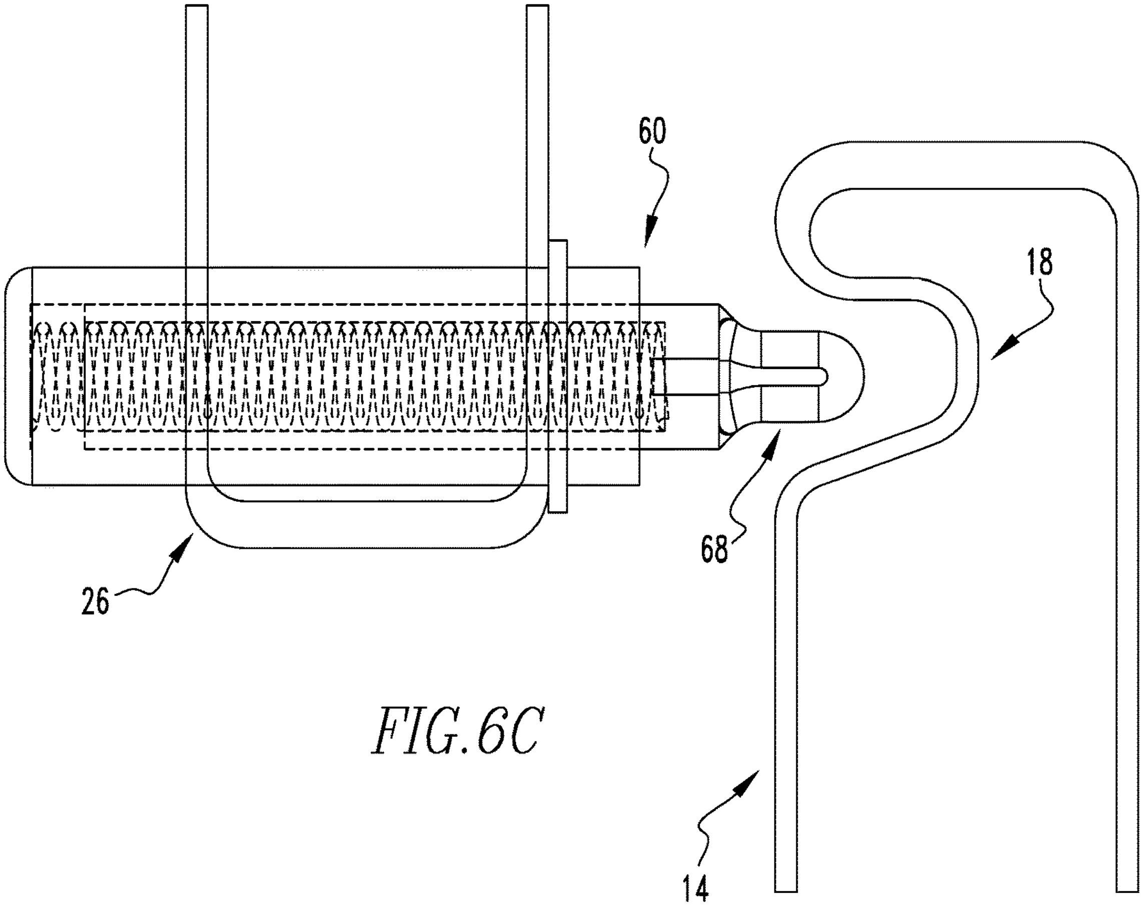
FIG. 6C shows the spring-loaded plunger guide bracket (retracted) engaged with a groove in a first box shaped base rail.

The follower bracket 28 may be L-shaped with a first portion 48 directly attached to the fly side 38 and a second portion 50 directly extending outwards from the first portion 48 which fits in the groove 18, as shown in FIGS. 3A-3D. Alternatively, the follower bracket 28 may be a spring guide bracket 52, as shown in FIGS. 5A and 5B that has a first portion 48 directly attached to the fly side 38 and a second portion 50 directly extending outwards from the first portion 48 forming a v shape and a third portion 54 directly extending upwards and outwards from the second portion 50 and having a free end 56 that forms a rounded hook 58 which fits in the groove 18. Alternatively, the follower bracket 28 may be a plunger guide bracket 60, as shown in FIGS. 6A-6C, having a cylinder 62 which is disposed in the first box shaped fly rail 26, a spring 64 disposed in the cylinder 62, a tube 66 disposed in the cylinder 62 and on the spring 64, and a bar 68 attached to outside the cylinder 62. The bar 68 fits in the groove 18, the spring 64 biasing the tube 66 outwards.

Figure 7B:
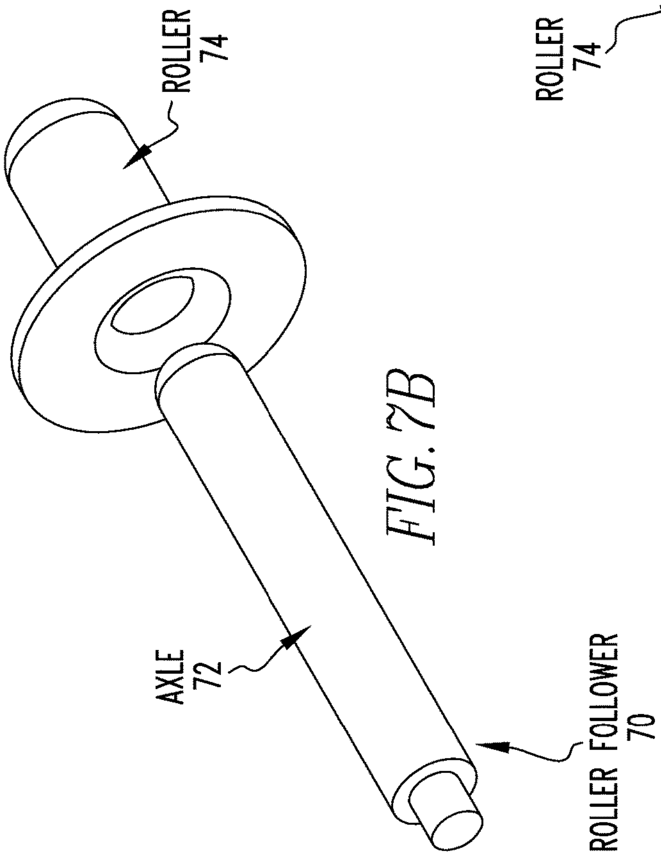
FIGS. 7A, 7B and 7C show a roller follower engaged with a groove in a first box shaped base rail, an exploded view of the roller follower and a perspective view of the roller follower, respectively.
Figure 7C:
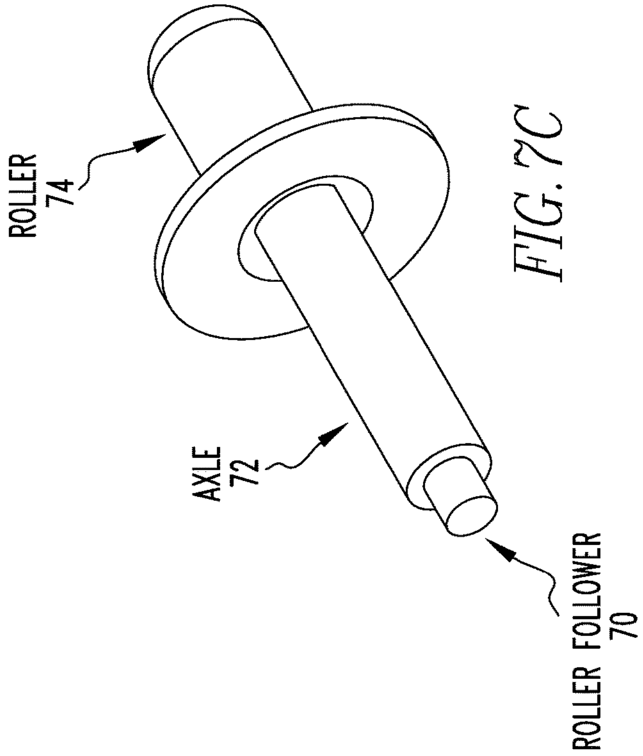
Figure 7A:
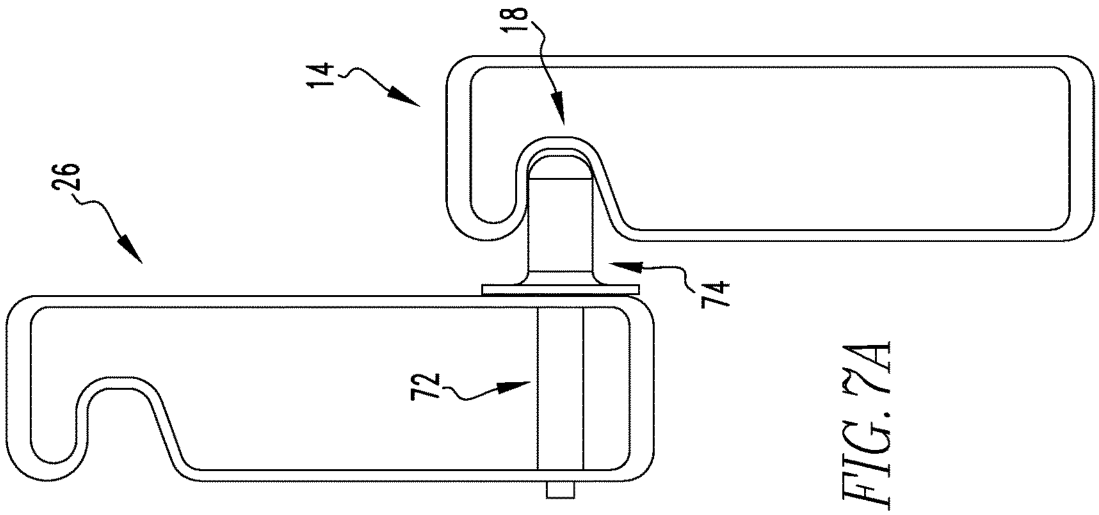

The follower bracket 28 may be a roller follower 70, as shown in FIGS. 7A-7C, having an axle 72 disposed in the first box shaped fly rail 26 and extending out fly side 38, and a roller 74 disposed on the axle 72 and in the groove 18, the roller 74 rotating as the first box shaped base rail 14 moves relative to the first box shaped fly rail 26. Alternatively, the follower bracket 28 may be a spring type guide bracket 76, as shown in FIGS. 8A and 9, having a C-shaped clamp 78 which fits on the second portion 50, and has a first tab 80 disposed on a top of the second portion 50, a second tab 82 disposed on a front of the second portion 50, and a third tab 84 disposed on a bottom of the second portion 50. The first and second and third tabs 80, 82, 84 each having a gap 86 with the second portion 50 in which the first and second and third tabs 80, 82, 84 can move up and down.

The groove 18 may have a fourth face 88 directly extending from the third face 46 and in parallel with the second face 44, and a fifth face 90 directly extending from the fourth face 88 and in parallel with the third face 46. The fifth face 90 directly extending from the flange 36. See FIG. 2A. The second face 44 and the third face 46 and the fourth face 88 forming the groove 18. Alternatively, the third face 46 may directly extend from the flange 36, as shown in FIG. 2B. The second face 44 and the third face 46 and the flange 36 forming the groove 18.

The present invention pertains to a method for producing an extension ladder 10. The method comprises the steps of putting a base section 12 in a desired position. The base section 12 having a first box shaped base rail 14 having a base side 16 and a groove 18 extending along the base side 16. There is the step of placing a follower bracket 28 attached to a first box shaped fly rail 26 of a fly section 24 in the groove 18. There is the step of moving the fly section 24 relative to the base section 12 with the follower bracket 28 in the groove 18 into a desired position.

The present invention pertains to a method for using an extension ladder 10. The method comprises the steps of moving the ladder 10 to a desired location. There is the step of placing the ladder 10 into a desired position. The ladder 10 comprises a base section 12 having a first box shaped base rail 14 having a base side 16 and a groove 18 extending along the base side 16 and a second box shaped base rail 20 in parallel and spaced relation to the first box shaped base rail 14, and base rungs 22 attached to the first and second box shaped base rails 14, 20. The ladder 10 comprises a fly section 24 having a first box shaped fly rail 26, a follower bracket 28 attached to the first box shaped fly rail 26 and extending outward toward the first box shaped base rail 14. The groove 18 is sized to engage the follower bracket 28 which constrains the fly section 24 to have limited motion relative to the base section 12 and a left to right and front to rear directions while permitting the fly section 24 to slide freely relative to the base section 12 when the fly section 24 is extended. The fly section 24 comprises a second box shaped fly rail 30 in parallel and spaced relation to the first box shaped fly rail 26 and fly rungs 32 attached to the first and second box shaped fly rails 26, 30.

In the operation of the invention, a groove 18 or indent extends preferably along the entire length of the sides of box shaped rails in the base section 12 of an extension ladder 10. The groove 18 can be formed in the web 34 portion of the rail profile or formed by extending the flange 36 portion of the profile, as shown in FIGS. 2A and 2B, respectively. This groove 18 is sized to engage follower brackets 28 which are attached to the fly section 24 or the fly section 24 rails. The follower brackets 28 can be of various forms which are described herein and shown in FIGS. 5A-9. This engagement constrains the fly section 24 to have limited motion relative to the base section 12 in the left to right and front to rear directions while permitting the fly section 24 to slide freely relative to the base section 12 when the fly is extended. By having a groove 18 in the base rails and follower brackets 28 on the fly rails, positive engagement is possible while maintaining the torsional stiffness advantages of the box rail.

This invention allows the overall construction of the ladder 10 to stay the same or similar to current products, while utilizing a box rail in place of a C-channel rail. Manufacturing processes to assemble the ladder 10 do not change drastically. A box rail also has structural advantages over a C-channel rail. It is better in side sway and twist testing, and can be designed to be on par in horizontal bend testing while keeping the overall weight comparable to a similar C-channel ladder.

In other embodiments, the follower bracket 28 could have a roller 74 which reduces friction as it rides in the groove 18. The groove 18 in the box rail could be used to house some kind of track which could hold a linear bearing slide to reduce movement friction. The follower bracket 28 which fits into the groove 18 could also have features which are spring-loaded in one or multiple directions to keep the fly section 24 centered between the base rails, eliminate play between the base section 12 and the fly section 24, and make for a smoother feeling ladder when the fly section 24 is being extended. The follower bracket 28 and groove 18 could engage each other through magnetic repulsion which would eliminate mechanical contact altogether.

FIG. 5A is a perspective view of a spring guide bracket 52.

FIG. 5B shows a rounded hook 58 of a free end 56 of a spring guide bracket 52 engaged in a groove 18 in a first box shaped base rail 14. The rounded hook 58 has a shape substantially the same as the groove 18 so the rounded hook 58 takes up tolerance primarily in the X direction.

FIG. 6A shows an exploded view of a spring-loaded plunger guide bracket 60.

FIG. 6B is a perspective view of the spring-loaded plunger guide bracket 60.

FIG. 6C shows the spring-loaded plunger guide bracket 60 (retracted) engaged with a groove 18 in a first box shaped base rail 14. The bar 68 of the spring-loaded plunger guide bracket 60 takes up tolerance in the X direction. The outer side of the bar 68 is rounded to have a shape substantially the same as the groove 18.

FIGS. 7A, 7B and 7C show a roller follower 70 engaged with a groove 18 in a first box shaped base rail 14, an exploded view of the roller follower 70 and a perspective view of the roller follower 70, respectively. The end of the roller 74 is rounded to have a shape substantially the same as the groove 18 to take up tolerance in the X direction. The roller 74 reduces sliding friction between the first box shaped base rail 14 and the first box shaped fly rail 26.

Figure 8:
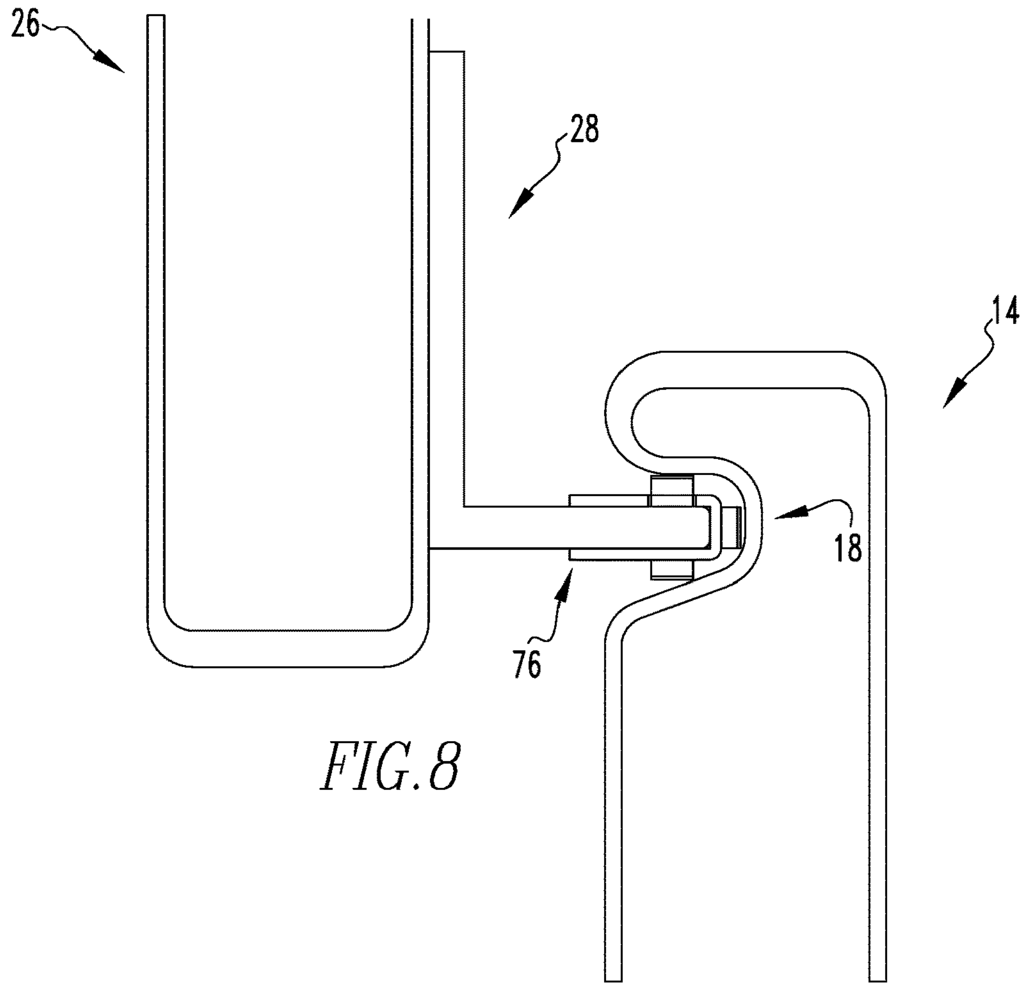
FIG. 8 shows a spring type guide bracket engaged with a groove of a first box shaped base rail.
Figure 9:
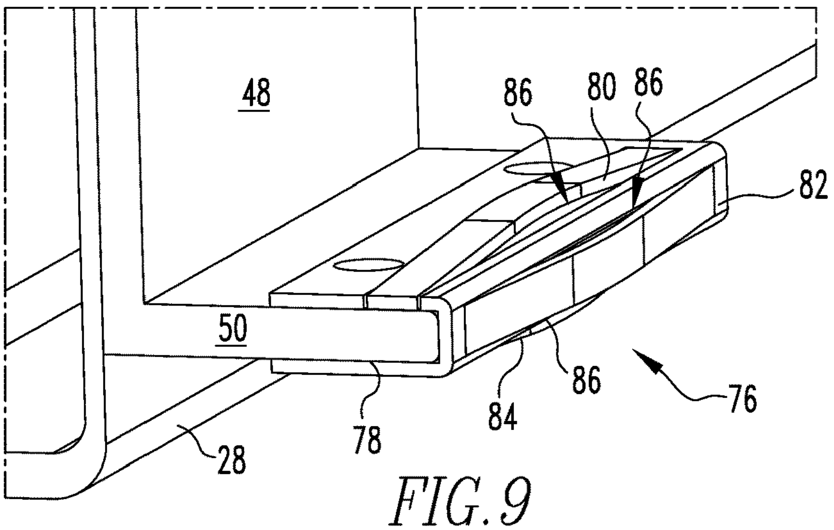
FIG. 9 shows a perspective view of the spring type guide bracket.

FIG. 8 shows a spring type guide bracket 76 engaged with a groove 18 of a first box shaped base rail 14. FIG. 9 shows a perspective view of the spring type guide bracket 76. The tabs act as springs to conform with the shape of the groove 18 and take up tolerance in a positive Y, negative Y and positive X direction.

One way to join a hollow rung to a ladder box rail, the rung is inserted through close-fitting holes in the inner and outer webs of the box rail. The outboard end of the rung protrudes a short distance, about .200 inches, past the outer web of the box rail. Tooling is used to cause the outboard end of the hollow rung to be flared and rolled over. Additional tooling is used to internally expand or bulge the hollow rung within the region between the box rail webs until the rung fits tightly in the holes in the webs. Another way is described in concurrently filed U.S. patent application Ser. No. 16/795,171, filed with the U.S. Patent and Trademark Office on Feb. 19, 2020, incorporated by reference herein.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. An extension ladder comprising:

a base section having a first box base rail having a base side and an indent formed into an inner web of the base side, a second box base rail in parallel and spaced relation to the first box base rail, and a plurality of base rungs attached to the first and second box base rails; and a fly section having a first box fly rail, a plurality of fly rungs attached to the first box fly rail, and a fly side, a single discrete follower bracket attached to the first box fly rail, the follower bracket being L-shaped having a first portion extending substantially parallel with the fly side and attached to the fly side via fasteners and a second portion extending substantially perpendicular to the first portion into the indent of the inner web of the base side of the first box base rail, the indent is sized relative to the second portion of the follower bracket to engage the second portion of the follower bracket while constraining the fly section to have limited motion relative to the base section and permitting the fly section to slide freely relative to the base section when the fly section is extended, a second box fly rail in parallel and spaced relation to the first box fly rail and fly rungs attached to the first and second box fly rails, wherein the indent is formed into an upper end of the base side of the first box base rail and the follower bracket is the single discrete follower bracket fastened to the first box fly rail at a lower end of the fly side of the first box fly rail between a lowest fly rung and a second lowest fly rung of the plurality of fly rungs, wherein the upper end of the base side of the first box base rail and the lower end of the fly side of the first box fly rail are offset from one another such that the follower bracket attached to the first box fly rail and the indent formed into the inner web of the base side align with one another and permit movement of the follower bracket along the indent, and wherein the first box base rail has a flange, the indent formed by the flange extending beyond the inner web.

2. The extension ladder of claim 1 wherein the first box fly rail has the fly side which opposes the inner web of the first box base rail.

3. The extension ladder of claim 2 wherein the indent is in parallel with the fly side, and the inner web has a first face, a second face directly extending from the first face away from the fly side, and a third face directly extending from the second face and in parallel with the first face, the second and third faces are part of the indent.

4. The extension ladder of claim 3 wherein the indent has a fourth face directly extending from the third face and in parallel with the second face, and a fifth face directly extending from the fourth face and in parallel with the third face, the fifth face directly extending from the flange, the second face and the third face and the fourth face forming the indent.

5. The extension ladder of claim 3 wherein the third face directly extends from the flange, the second face and the third face and the flange forming the indent.

6. The extension ladder of claim 1 wherein the first box fly rail and the second box fly rail each include a second indent.

7. The extension ladder of claim 6 wherein the first fly rail includes a web and a flange, the second indent formed by the flange extending beyond the web.

8. The extension ladder of claim 6 wherein the second fly rail includes a web and a flange, the second indent formed by the flange extending beyond the web.

9. The extension ladder of claim 7 wherein the web of the second indent of the first box fly rail includes a first face, a second face directly extending perpendicularly from the first face, and a third face directly extending from the second face and in parallel with the first face, the second face and the third face are part of the second indent.

10. The extension ladder of claim 8 wherein the web of the second indent of the second box fly rail includes a first face, a second face directly extending perpendicularly from the first face, and a third face directly extending from the second face and in parallel with the first face, the second face and the third face are part of the second indent.

11. The extension ladder of claim 9 wherein the second indent of the first box fly rail includes a fourth face directly extending from the third face and in parallel with the second face, and a fifth face directly extending from the fourth face and in parallel with the third face, the fifth face directly extending from the flange, the second face and the third face and the fourth face forming the second indent.

12. The extension ladder of claim 10 wherein the second indent of the second box fly rail includes a fourth face directly extending from the third face and in parallel with the second face, and a fifth face directly extending from the fourth face and in parallel with the third face, the fifth face directly extending from the flange, the second face and the third face and the fourth face forming the second indent.

13. The extension ladder of claim 9 wherein the third face directly extends from the flange, the second face and the third face and the flange forming the second indent of the first box fly rail.

14. The extension ladder of claim 10 wherein the third face directly extends from the flange, the second face and the third face and the flange forming the second indent of the second box fly rail.

15. The extension ladder of claim 1 wherein the indent allows the first box fly rail and the second box fly rail to be nested substantially inside of the first box base rail and the second box base rail.

16. The extension ladder of claim 6 wherein the second indent allows for additional fly section to be nested substantially inside of the first box fly rail and the second box fly rail.

17. The extension ladder of claim 1 wherein the indent extends longitudinally along a first box base rail, the indent permitting longitudinal movement of the follower bracket toward the upper end of the first box base rail and a lower end of the first box base rail and limiting lateral movement relative to the first box base rail.

18. The extension ladder of claim 1 wherein the indent is sized relative to the second portion of the follower bracket such that only a portion of the second portion of the follower bracket contacts the indent.

* * * * *